(12) United States Patent
Watanabe et al.

(10) Patent No.: US 7,580,689 B2
(45) Date of Patent: Aug. 25, 2009

(54) TRANSMISSION METHOD, TRANSMITTER, RECEPTION METHOD, AND RECEIVER

(75) Inventors: Katsumi Watanabe, Tokyo (JP); Sachio Iida, Chiba (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 11/488,021

(22) Filed: Jul. 18, 2006

(65) Prior Publication Data

US 2006/0258309 A1 Nov. 16, 2006

Related U.S. Application Data

(62) Division of application No. 10/764,448, filed on Jan. 27, 2004, now Pat. No. 7,162,213.

(30) Foreign Application Priority Data

Feb. 3, 2003 (JP) ............................. 2003-026459

(51) Int. Cl.
*H04B 1/18* (2006.01)
(52) U.S. Cl. ................ 455/188.1; 455/314; 455/324
(58) Field of Classification Search ............... 455/313, 455/314, 318, 323, 324, 132, 188.1, 266; 375/324, 340, 343
See application file for complete search history.

(56) References Cited

U.S. PATENT DOCUMENTS 4,817,116 A 3/1989 Akaiwa et al.

5,148,127 A 9/1992 Cheon

FOREIGN PATENT DOCUMENTS

JP 06-244882 9/1994
JP 07-177057 7/1995

OTHER PUBLICATIONS

Kumud Kashyap et al., "A study on the performance of the CDMA system using π/4-shift QPSK and π/2-shift BPSK," Technocal Report of IEICE, vol. 95, No. 594, Mar. 1996, pp. 95-100.

*Primary Examiner*—Nguyen Vo
(74) *Attorney, Agent, or Firm*—Oblon, Spivak, McClelland, Maier & Neustadt, P.C.

(57) ABSTRACT

For the purpose of efficient transmission based on the UWB system, first and second baseband waveforms are generated at a cycle equivalent to an integral multiple of a carrier to have a specified phase difference from each other. The first baseband waveform is multiplied by the carrier and a first transmission data sequence to acquire a first transmission waveform. The second baseband waveform is multiplied by a phase shifted carrier and a second transmission data sequence to acquire a second transmission waveform. The first transmission waveform is mixed with the second transmission waveform to acquire a transmission signal. The transmission signal is transmitted as a π/2 shift BPSK signal to transmit a UWB signal. Selecting the baseband waveforms and the carrier makes it possible to configure the transmission band and easily provide division multiplexing transmission.

10 Claims, 18 Drawing Sheets

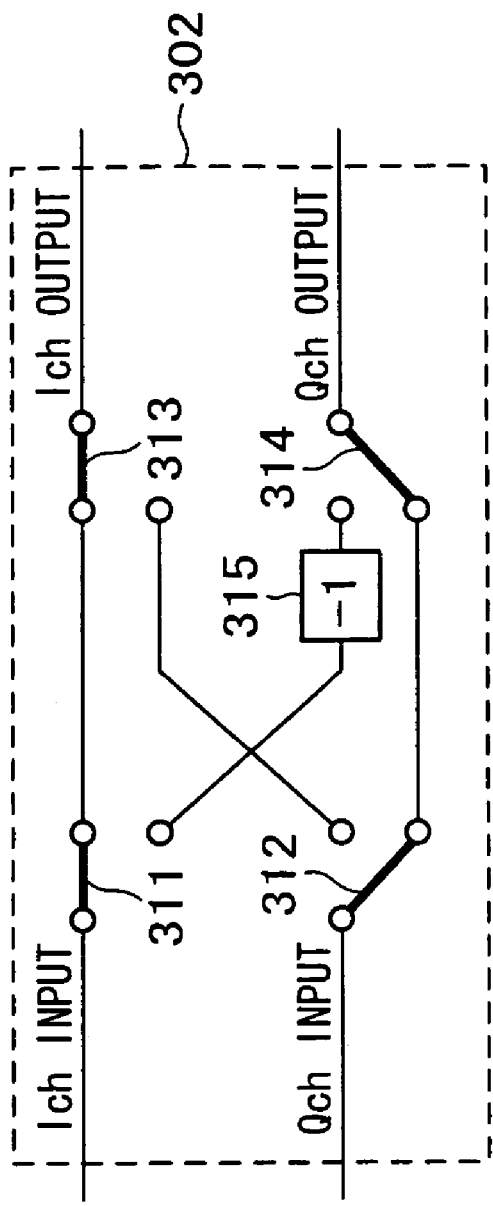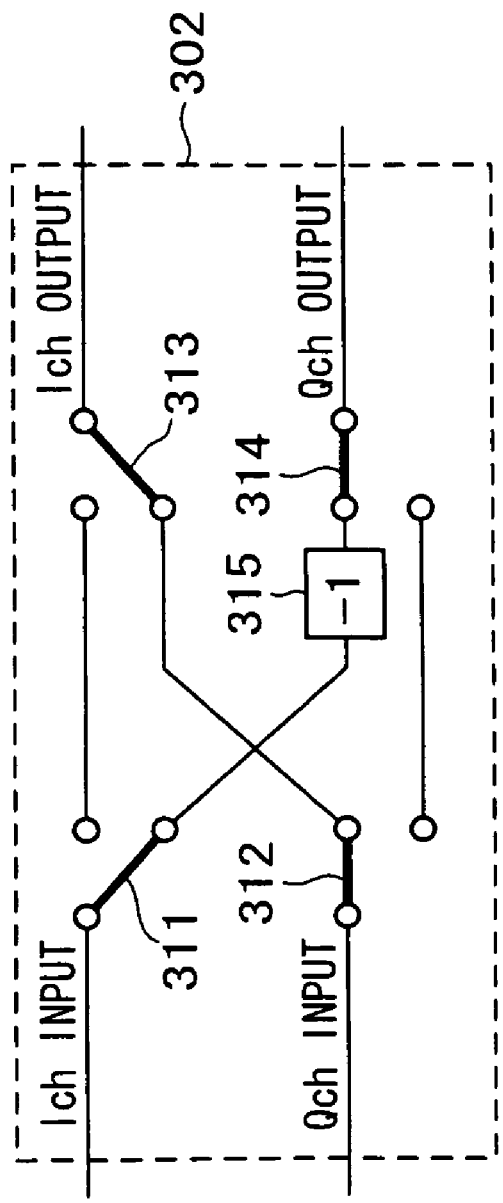

TRANSMISSION METHOD, TRANSMITTER, RECEPTION METHOD, AND RECEIVER

BACKGROUND OF THE INVENTION

1. Field of the Invention

The present invention relates to a transmission method and a transmitter according to the ultra wide band (UWB) system and a reception method and a receiver according to the UWB system.

2. Description of Related Art

Particular attention has been paid to the UWB system as one of wireless transmission systems. The UWB system realizes transmission using a very wide transmission band of, for example, several gigahertzes and using very short pulses.

FIG. 13 shows a configuration example of a conventional UWB transceiver. An antenna 11 is connected to an antenna changer 13 via a band-pass filter 12. The antenna changer 13 is connected to reception-related circuits and transmission-related circuits. The antenna changer 13 functions as a selection switch to operate in interlock with transmission and reception timings. The band-pass filter 12 passes signals of transmission band widths of several gigahertzes such as 4 GHz to 9 GHz used for the system.

The reception-related circuits connected to the antenna changer 13 include a low noise amplifier 14, 2-system multipliers 15I and 15Q, low pass filters 16I and 16Q, and analog-digital converters 17I and 17Q. The low noise amplifier 14 amplifies an output from the antenna changer 13 for reception. The multipliers 15I and 15Q multiply an output from the low noise amplifier 14 by outputs from pulse generators 25I and 25Q. The low pass filters 16I and 16Q eliminate high frequency components from outputs from the multipliers 15I and 15Q. The analog-digital converters 17I and 17Q sample outputs from the low pass filters 16I and 16Q.

Output pulses from the pulse generator 25I and 25Q are phase-shifted from each other by the specified amount. The analog-digital converter 17I samples I-channel transmission data. The analog-digital converter 17Q samples Q-channel transmission data. Received data for each channel is supplied to the baseband circuit 30 for reception processing. In this example, received data for the I channel is used as is. Received data for the Q channel is used as an error signal.

As transmission-related circuits, the multiplier 26 is supplied with transmission data output from the baseband circuit 30. The transmission data is multiplied by an output from the pulse generator 25I. The transmission data output from the baseband circuit 30 is modulated, e.g., as an NRZ (Non Return to Zero) signal. The multiplier 26 multiplies the transmission data by an output from the pulse generator 25I to generate a bi-phase modulated pulse. This becomes a signal modulated by the so-called BPSK (Binary Phase Shift Keying) system. In order to allow the pulse generator 25I to generate pulses, there is provided a Voltage Controlled Temperature Compensated Crystal Oscillator (VCTCXO, hereafter simply referred to as an oscillator) 21 to control oscillation frequencies of the oscillator 21 based on an error signal acquired from received data for the Q channel.

An oscillation signal from the oscillator 21 is supplied to a PLL (phase locked loop) circuit 22. A voltage control oscillator 23 constitutes a loop for the PLL circuit 11. An oscillated output from the voltage control oscillator 23 is supplied to the pulse generator 25I to generate a pulse synchronized to the oscillated output from the oscillator 23. A phase shifter 24 supplies a pulse generator 25Q with an output from the oscillator 23 by delaying a specified cyclic phase. This makes it possible to generate a short wavelength pulse synchronized with the oscillated output from the oscillator 23 at a timing delayed from an output pulse of the pulse generator 25I.

A multiplier 26 multiplies an output pulse from the pulse generator 25Q by the transmission data to use the multiplication output as a transmission signal. The transmission signal output from the multiplier 26 is supplied to a power amplifier 27 and is amplified there for transmission. The amplified output is supplied to the band-pass filter 12 via the antenna changer 13. The band-pass filter 12 limits the band to pass only signals for the transmission band. The transmission signal is then transmitted from the antenna 11.

FIG. 14 shows a process example in the baseband circuit 30. A despreader circuit 31 is supplied with received data for the I and Q channels for a despread process, i.e., the reverse of transmission despreading. The despread received data for the I channel is supplied to a data demodulation circuit 32 for demodulation. The received data is then supplied to a CRC circuit 33 for error detection and correction. The processed received data is supplied to a UWB communication management and processing section 34 for processing in layers specified in this communication system.

A loop filter 35 extracts an error component from the Q channel's received data despread in the despreader circuit 31. The error component is supplied as a control signal to the oscillator 21 in FIG. 13.

FIG. 15 shows an example of frequency spectrum for transmission signals. The example in FIG. 15 uses a band of approximately 10 GHz. FIG. 16 exemplifies a time waveform of transmitted signals. The UWB system transmits a very short pulse of one nanosecond or less. It is known that such a short wavelength pulse has a very wide bandwidth of at least several gigahertzes on a frequency axis. Accordingly, there is provided the frequency spectrum as shown in FIG. 15.

Transmission signals may be available not only in the mono-cycle (one cycle) pulse waveform as shown in FIG. 16, but also in a 2-cycle or 3-cycle pulse waveform. FIG. 17 shows a time waveform according to the 2-cycle pulse (bi-cycle pulse). The 2-cycle pulse can increase a transmission power compared to the 1-cycle pulse.

When a signal is transmitted in this manner and is received, the received signal is held for synchronization as follows. For example, a pulse is delayed from the I-channel signal for specified amount 001. This pulse is used as a template waveform for the Q channel to find a value of correlation between the received signal and the template waveform. The oscillation phase of the oscillator is controlled based on the correlation value. FIG. 18 exemplifies a cross-correlation waveform during transmission of the 2-cycle pulse in FIG. 17. When the oscillation phase is controlled based on the correlation values as shown in FIG. 18, it becomes possible to perform reception processing in precise synchronization with received data.

Non-patent document 1 outlines the UWB system.

[Non-patent document 1]

Nikkei Electronics, 11 Mar. 2002, pp. 55-66.

Presently, the UWB system is subject to the FCC (Federal Communications Commission) specifications in the U.S. The FCC specifications include radiation intensities for indoor and outdoor frequency bands. For example, the transceiver in FIG. 13 needs to be configured so that the band-pass filter 12 connected to the antenna 11 can provide the spectrum compliant with the specifications. If the band-pass filter performs a process needed for this purpose, however, a filter's group delay greatly oscillates the pulse waveform, causing an inter-pulse interference. When an inter-pulse interference exists, it is necessary to increase a time interval between pulses, decreasing a chip rate. The interference can be reduced if it is possible to increase the interval between pulses by maintaining the chip rate. This has been difficult with the conventional processing.

The conventional UWB system basically uses all provided transmission bands, e.g., bands permitted for use by FCC. The gigahertz bands to be used for the UWB system include bands already used for the other systems. It is necessary to limit the transmission power for the already used bands. However, the band-pass filter needs to limit transmission signal bands in order to limit only part of the bands. As mentioned above, if the band-pass filter limits bands, a filter's group delay deforms the pulse waveform and decrease the transmission efficiency.

SUMMARY OF THE INVENTION

The present invention has been made in consideration of the foregoing. It is therefore an object of the present invention to provide the UWB system with efficient transmission.

According to a first aspect of the present invention, there is provided a transmission method comprising the steps of: acquiring a carrier of a specified frequency; acquiring first and second transmission data sequences; generating a first baseband waveform of a cycle equivalent to an integral multiple of the carrier and multiplying the generated first baseband waveform by the carrier and the first transmission data sequence to acquire a first transmission waveform; generating a second baseband waveform having a specified phase difference from the first baseband waveform at the cycle equivalent to the integral multiple of the carrier and multiplying the generated second baseband waveform by the phase shifted carrier resulting from phase shift of the carrier and the second transmission data sequence to acquire a second transmission waveform; and mixing the first transmission waveform with the second transmission waveform to acquire a transmission signal and transmitting the transmission signal.

Since a transmission signal is acquired as mentioned in the first aspect of the present invention, the first and second transmission data sequences are quadrature-modulated onto transmit the signal as a so-called π/2 shift BPSK modulation wave. Selecting the carrier and each of the baseband waveforms can transmit the signal as a UWB signal that is transmitted by using an intended center frequency and the frequency band.

According to a second aspect of the present invention, there is provided a reception method comprising the steps of: acquiring a received carrier of a specified frequency; extracting a received signal for a transmission band, multiplying the extracted received signal by the received carrier, and sampling the multiplied signal at a specified cycle equivalent to an integral multiple of the received carrier to acquire first received data; and multiplying the received signal by a phase-shifted received carrier resulting from phase-shifting the received carrier and sampling the multiplied signal at a specified cycle equivalent to an integral multiple of the received carrier to acquire second received data.

The reception process according to the second aspect of the present invention can extract the first and second received data quadrature-modulated onto the received signal in synchronization with the received carrier. It becomes possible to receive a signal that is transmitted as the so-called π/2 shift BPSK modulation wave.

BRIEF DESCRIPTION OF THE DRAWINGS

FIG. 5 is a configuration diagram showing a configuration example of a swap circuit according to the embodiment of the present invention;

DETAILED DESCRIPTION OF THE PREFERRED EMBODIMENTS

Embodiments of the present invention will be described in further detail with reference to the accompanying drawings, i.e., FIGS. 1 through 12.

Figure 1:
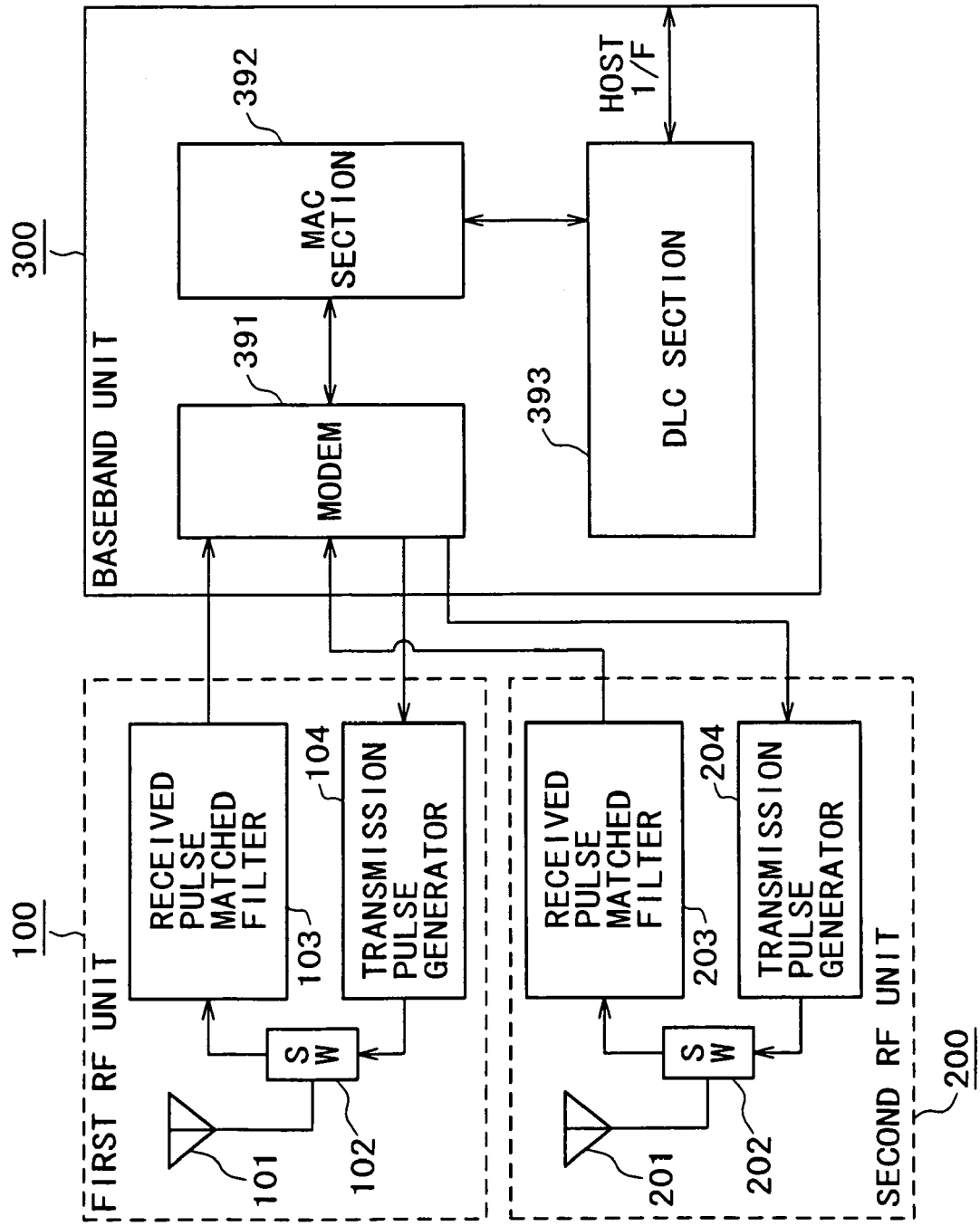
FIG. 1 is a block diagram showing a configuration example of a communication apparatus according to an embodiment of the present invention.

The example uses a transceiver applied to the UWB system capable of wireless transmission. FIG. 1 exemplifies the entire configuration of the transceiver according to the example. In this example, a first RF unit 100 and a second RF unit 200 are connected to a baseband unit 300. The first RF unit 100 and the second RF unit 200 perform different wireless communication processes. Specifically, for example, the band for wireless transmission in the UWB system is divided into at least lower and upper portions. The first RF unit 100 uses the lower band for communication. The second RF unit 200 uses the upper band for communication.

Even if the transmission band is divided, it is not always necessary to provide a plurality of RF units as shown in FIG.

1 or use each RF unit as a special communication means for the corresponding band. This topic will be discussed later.

The first RF unit 100 comprises an antenna 101, an antenna changer 102, a received pulse matched filter 103, and a transmission pulse generator 104. The antenna changer 102 is connected to the antenna 101. The received pulse matched filter 103 processes signals received at the antenna 101. The transmission pulse generator 104 generates a transmission signal. Likewise, the second RF unit 200 comprises an antenna 201, an antenna changer 202, a received pulse matched filter 203, and a transmission pulse generator 204. The antenna changers 102 and 202 function as switches to choose from the received pulse matched filter and the transmission pulse generator in interlock with transmission and reception timings.

The baseband unit 300 comprises a UWB modem 391, an MAC (media access control) section 392, and a DLC (data link control) section 393. The MAC section 392 and the DLC section 393 perform processes on the corresponding layers for the access control system installed in the communication system. The MAC section 392 and the DLC section 393 are capable of various known processes or possible processes to be specified for the UWB system in the future.

Figure 2:
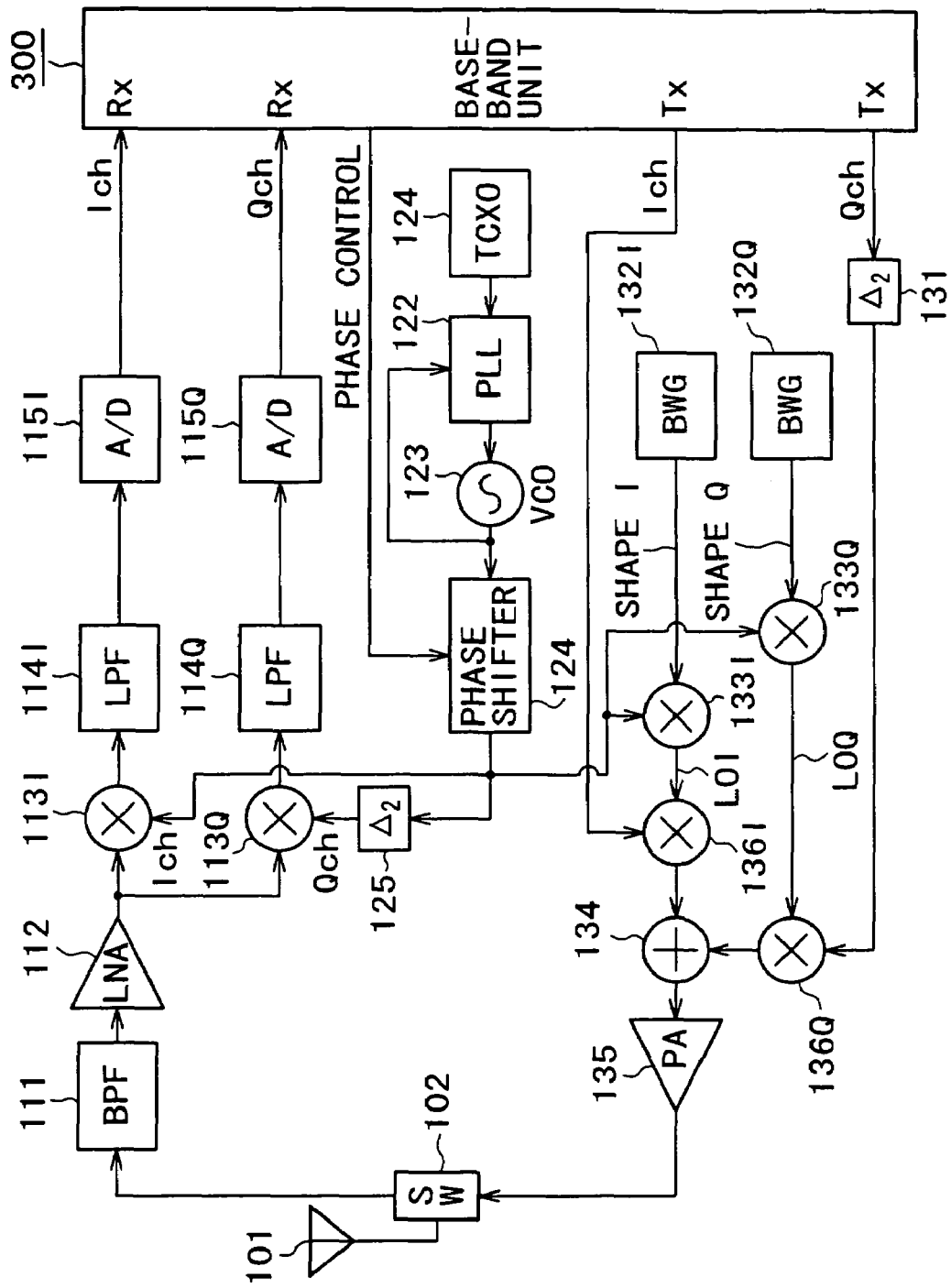
FIG. 2 is a block diagram showing a configuration example of an RF unit according to the embodiment of the present invention.

FIG. 2 exemplifies an internal configuration of the first RF unit 100. The antenna 101 for transmission and reception is connected to the antenna changer 102. The antenna changer 102 connects with the reception circuit constituting the received pulse matched filter 103 and the transmission circuit constituting the transmission pulse generator 104. When the same transmission band is used for transmission and reception processes, the example performs these processes in a time division manner.

Referring now to FIG. 2, the following describes the reception circuit represented as the received pulse matched filter 103 in FIG. 1. The antenna changer 102 outputs a received signal to the band-pass filter 111 that passes the signal corresponding to the reception band. An output from the filter 111 is supplied to a low noise amplifier 112 that amplifies it for reception. The low noise amplifier 112 supplies the amplified output to two multipliers 113I and 113Q. The multipliers 113I and 113Q function as matched filters. That is to say, the multipliers 113I and 113Q multiply the amplified output by a carrier output from the phase shifter 124 or by a phase shifted carrier from the delay circuit 125 to extract the transmitted I-channel and Q-channel reception pulses. The delay circuit 125 delays the carrier output from the phase shifter 124 to produce the phase shifted carrier.

The low pass filters 114I and 114Q are supplied with outputs from the multipliers 113I and 113Q to remove the high frequency components. The analog-digital converters 115I and 115Q are supplied with outputs from the low pass filters 114I and 114Q and sample the signals at specified timings to generate digital data. The baseband unit 300 is supplied with sampling outputs for the I and Q channels as received data RxI and RxQ for the I and Q channels, respectively.

The temperature compensating oscillator 121 is provided to generate carriers. The temperature compensating oscillator 121 supplies an oscillated output to a PLL (phase locked loop) circuit 122. A voltage control oscillator 123 constitutes a loop for the PLL circuit 122. The oscillated output from the voltage control oscillator 123 is supplied to a phase shifter 124. The phase shifter 124 adjusts the phase of oscillated output from the voltage control oscillator 123 based on a phase control signal supplied from the baseband unit 300. The phase shifter 124 directly supplies the phase-adjusted signal as a carrier for reception to the multiplier 113I. The multiplier 113I multiplies the received wave by the carrier to yield an I-channel signal. The delay circuit 125 delays the output from the phase shifter 124. The carrier for reception is phase-shifted by the specified amount and is supplied to the multiplier 113Q. The multiplier 113Q multiplies the received wave by the carrier to yield a Q-channel signal. A detailed description will be given on the amount of delay for the reception carrier supplied by the delay circuit 125.

Referring now to FIG. 2, the following describes the transmission circuit represented as the transmission pulse generator 104 in FIG. 1. The baseband unit 300 according to the example is configured to generate 2-channel transmission data, i.e., I-channel transmission data TxI and Q-channel transmission data TxQ. The I-channel transmission data TxI is supplied to the multiplier 136I. The multiplier 136I multiplies the I-channel transmission data TxI by signal LOI that is a result of multiplication between the carrier and a baseband waveform generated in the baseband waveform generation circuit 132I. The Q-channel transmission data TxQ is supplied to the delay circuit 131 and is delayed for a specified amount. The delayed Q-channel transmission data TxQ is supplied to the multiplier 136Q. The multiplier 136Q multiplies the Q-channel transmission data TxQ by signal LOQ that is a result of multiplication between the carrier and a baseband waveform generated in the baseband waveform generation circuit 132Q.

The same delay amount is used for the delay circuits 125 and 131. The detail will be described later. Here, the delay amount for the delay circuits 125 and 131 is assumed to be $\Delta_2$.

The baseband waveform generation circuits 132I and 132Q generate baseband waveforms ShapeI and ShapeQ that increase and decrease parabolically and repeatedly at specified cycles. Examples of the baseband waveforms ShapeI and ShapeQ will be also described later. The two baseband waveform generation circuits 132I and 132Q generate the same waveform. Only the waveform's phases are shifted approximately 180 degrees from each other.

The multiplier 133I is supplied with the baseband waveform ShapeI generated from the baseband waveform generation circuit 132I. The multiplier 133I multiplies ShapeI by the carrier output from the phase shifter 124 to generate a multiplied signal LOI. The multiplier 133Q is supplied with the baseband waveform ShapeQ generated in the baseband waveform generation circuit 132Q. The multiplier 133Q multiplies ShapeQ by the carrier output from the phase shifter 124 to generate a multiplied signal LOQ.

Multiplied outputs from the multipliers 133I and 133Q are supplied to the multipliers 136I and 136Q; respectively. The multiplied outputs are further multiplied by transmission data TxI and TxQ. Multiplied outputs are supplied to the adder 134 that adds them to each other to generate a 1-channel signal. A power amplifier 135 amplifies the 1-channel signal to yield a transmission signal. The antenna changer 102 supplies the transmission signal to the antenna 101 for wireless transmission.

Figure 3:
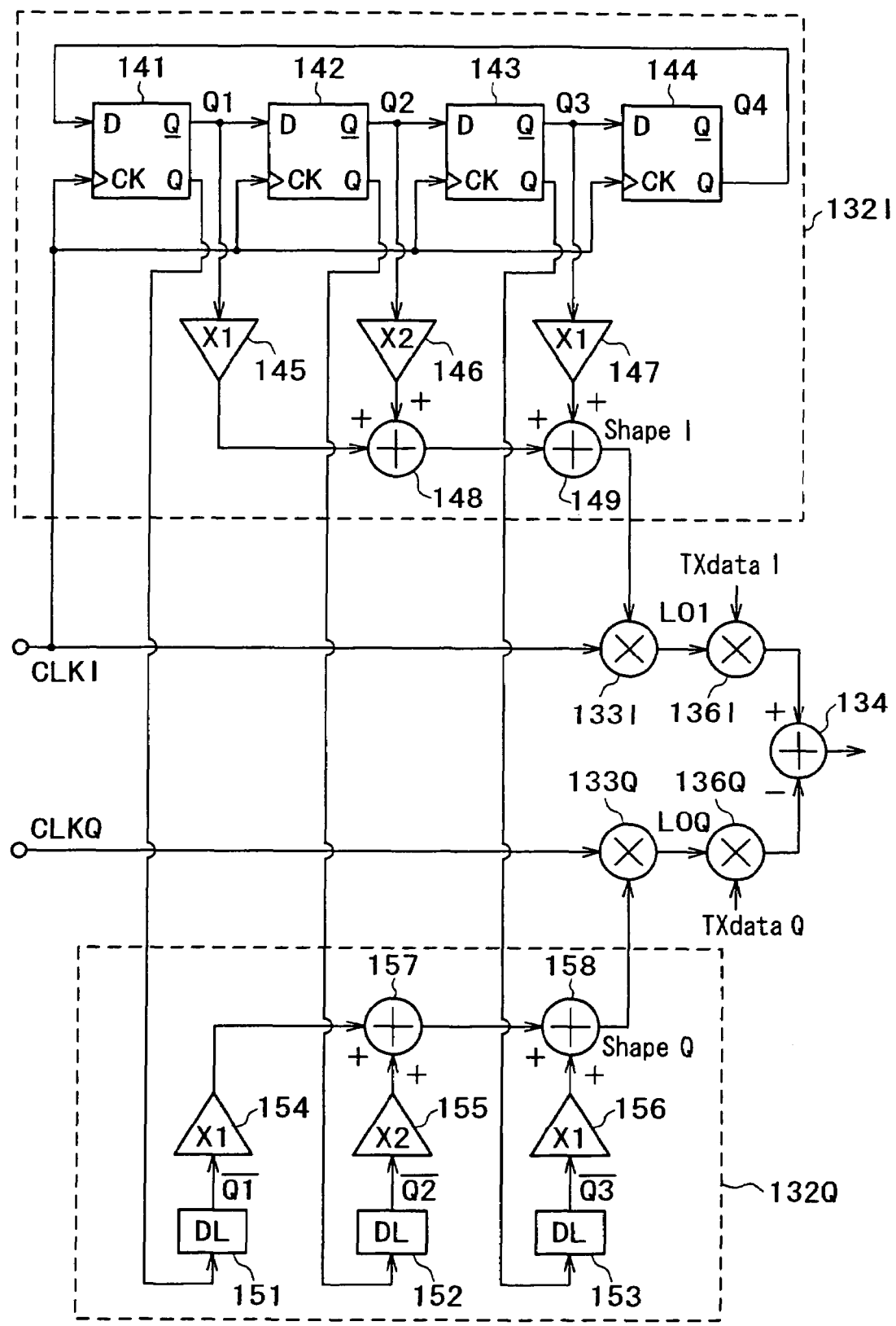
FIG. 3 is a block diagram showing a configuration example of a baseband wave generation circuit according to the embodiment of the present invention.

FIG. 3 exemplifies configurations of the baseband waveform generation circuits 132I and 132Q. A clock input terminal 140I is supplied with an I-channel clock (carrier). A clock input terminal 140Q is supplied with a Q-channel clock (carrier). These clocks are supplied from the phase shifter 124 and may be referred to as carriers in the following description. There is provided a specified phase between the I-channel clock CLK I and the Q-channel clock CLK Q.

The I-channel clock CLK I is supplied to four clock input terminals D flip-flops 141 through 144 provided for the baseband waveform generation circuit 132I. The D flip-flop 141 generates Q output Q1 that is then supplied to a D input terminal of the next D flip-flop 142. The D flip-flop 142 generates Q output Q2 that is then supplied to a D input terminal of the next D flip-flop 143. The D flip-flop 143 generates Q output Q3 that is then supplied to a D input terminal of the next D flip-flop 144. The D flip-flop 144 generates inverted Q output Q4 that is then supplied to a D input terminal of the D flip-flop 141.

The Q output Q1 from the D flip-flop 141 is supplied to the adder 148 via a coefficient multiplier 145. The Q output Q2 from the D flip-flop 142 is supplied to the adder 148 via a coefficient multiplier 146. The adder 148 adds both outputs. An added output from the adder 148 is supplied to the adder 149. The Q output Q3 from the D flip-flop 143 is supplied to the adder 149 via a coefficient multiplier 147. The adder 149 adds both signals to yield the baseband waveform ShapeI. An example of the baseband waveform ShapeI will be described later. Here, the coefficient multiplier 146 uses coefficient 2 for multiplication. The other coefficient multipliers 145 and 147 use coefficient 1 for multiplication.

The adder 149 outputs the baseband waveform ShapeI that is then supplied to the multiplier 133I. The multiplier 133I multiplies the baseband waveform ShapeI by the clock CLK I, i.e., the I-channel carrier. A multiplied output from the multiplier 133I is supplied to the multiplier 136I. The multiplier 136I multiplies the output by the transmission data TxI and supplies a multiplied output to the adder 134.

The three D flip-flops 141, 142, and 143 in the baseband waveform generation circuit 132I generate inverted Q outputs that are then supplied to the baseband waveform generation circuit 132Q. In the baseband waveform generation circuit 132Q, the inverted Q output from the D flip-flop 141 is supplied to an adder 157 via a delay circuit 151 and a coefficient multiplier 154. The inverted Q output from the D flip-flop 142 is supplied to the adder 157 via a delay circuit 152 and a coefficient multiplier 155. The adder 157 adds both signals. The inverted Q output from the D flip-flop 143 is supplied to an adder 158 via a delay circuit 153 and a coefficient multiplier 156. The adder 158 adds the inverted Q output and the added output from the adder 157. The adder 158 yields an added output as the baseband waveform ShapeQ. An example of the baseband waveform ShapeI will be described later. Here, the coefficient multiplier 155 uses coefficient 2 for multiplication. The other coefficient multipliers 154 and 156 use coefficient 1 for multiplication.

The multiplier 133Q is supplied with the baseband waveform ShapeQ output from the adder 158. The multiplier 133Q multiplies the baseband waveform ShapeQ by the clock CLK Q, i.e., the Q-channel carrier. A multiplied output from the multiplier 133Q is supplied to the multiplier 136Q. The multiplier 136Q multiplies the multiplied output by the transmission data TxQ and supplies the multiplied output to the adder 134.

The adder 134 adds an output from the multiplier 136I and an output from the multiplier 136Q and supplies an added output to the power amplifier 135 for transmission (see FIG. 2). According to the configuration in FIG. 3, the baseband waveform ShapeI is multiplied by the carrier. The multiplied signal is then multiplied by the transmission data. The sequence of multiplication may be specified otherwise.

Figure 4:
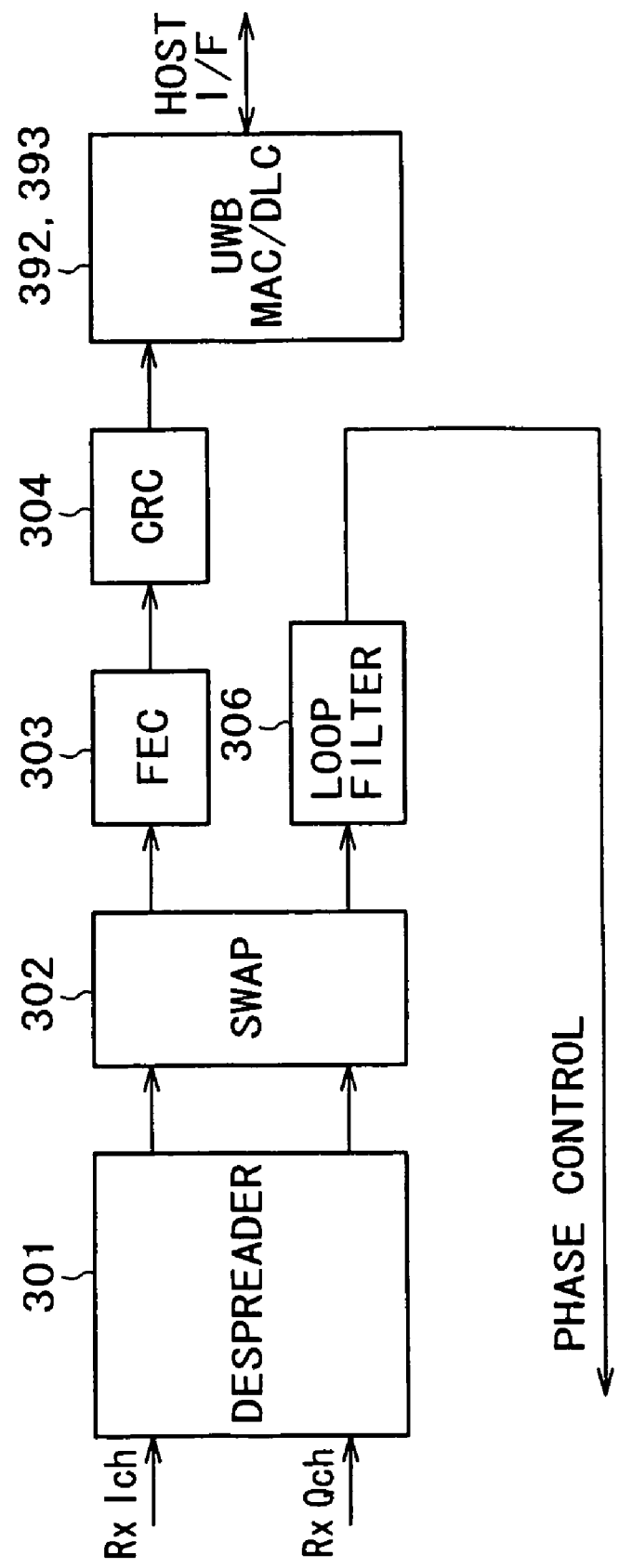
FIG. 4 is a configuration diagram showing part of a baseband circuit according to the embodiment of the present invention.

With reference to FIG. 4, the following describes part of received data processing in the UWB modem 391 of the baseband unit 300. When the baseband unit 300 is supplied with the I-channel and Q-channel received data RxI and RxQ, the despreader 301 performs a despread process, i.e., the reverse of transmission despreading. The despreader 301 then supplies the despread received data RxI and RxQ for both channels to a swap circuit 302. The swap circuit 302 unifies the received data for both channels and outputs a signal for detecting phase error information. A configuration example of the swap circuit 302 will be described later.

After the swap circuit 302 unifies the received data, the demodulator 303 demodulates the received data in compliance with the modulation for transmission. The demodulated data is supplied to an error correction section 304. The error correction section 304 performs error correction using the CRC (Cyclic Redundancy Check) code, for example. The error-corrected data is supplied to the other processing sections such as the MAC section 392 and the DLC section 393 in the baseband unit 300.

The swap circuit 302 supplies a loop filter 306 with the output signal for acquiring the phase error information. The loop filter 306 extracts the phase error information that is then supplied as a phase control signal to the phase shifter 124 in FIG. 2.

FIG. 5 exemplifies a configuration of the swap circuit 302. FIGS. 5A and 5B show two switching states of one swap circuit 302. As shown in FIG. 5, the swap circuit 302 comprises four selection switches 311 through 314 and a sign inverter 315. The swap circuit 302 is capable of alternately selecting the switching states in FIGS. 5A and 5B.

In one switching state of the swap circuit 302 as shown in FIG. 5A, the I-channel received data RxI is supplied to the demodulator 303 via the selection switches 311 and 313. The Q-channel received data RxQ is supplied to the loop filter 306 via the selection switches 312 and 314.

In the other switching state of the swap circuit 302 as shown in FIG. 5B, the Q-channel received data RxQ is supplied to the demodulator 303 via the selection switches 312 and 313. The I-channel received data RxI is supplied to the loop filter 306 via the selection switch 311, the sign inverter 315, and the selection switch 314.

Figure 6:
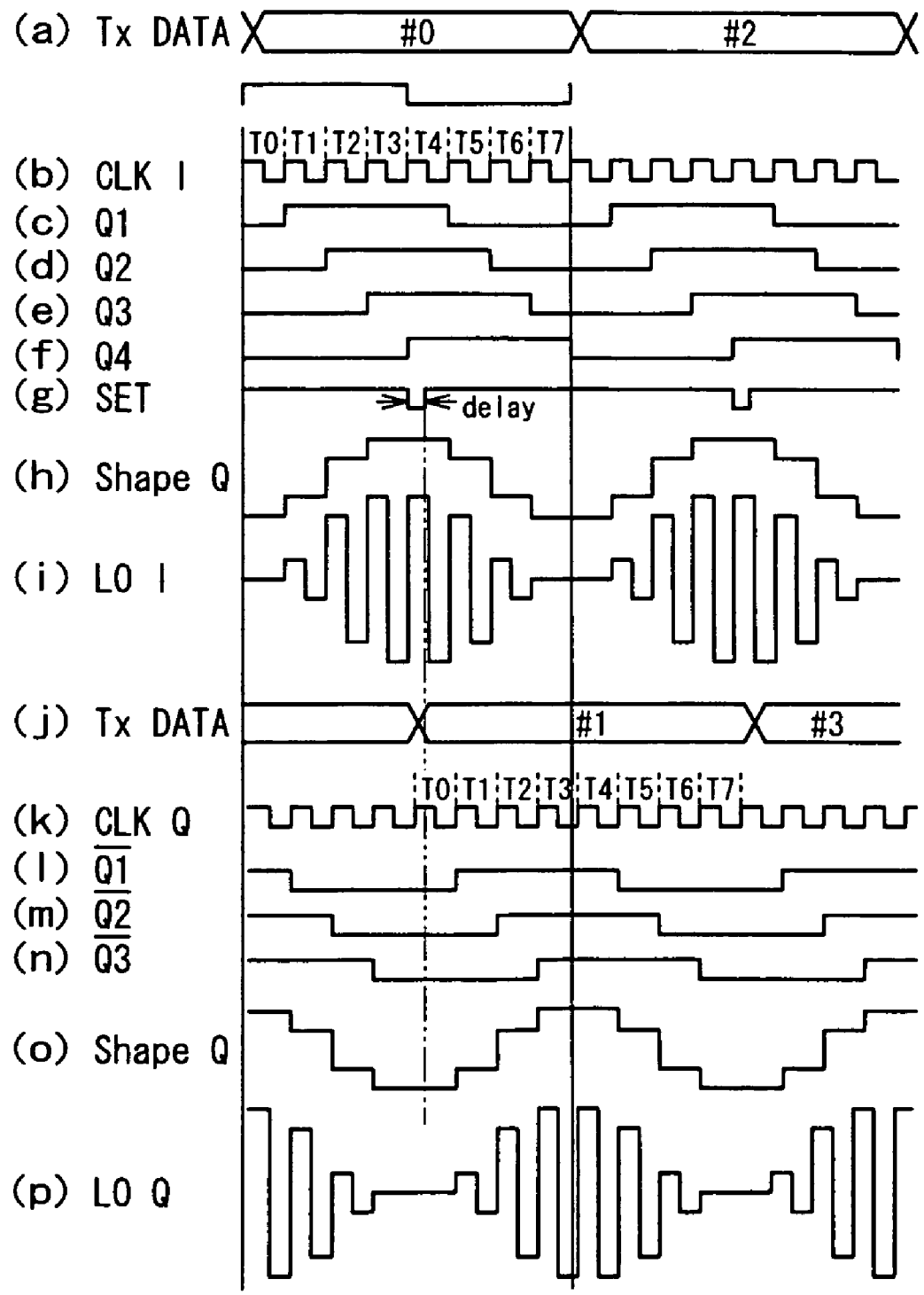
FIG. 6 is a characteristic diagram exemplifying baseband waveforms according to the embodiment of the present invention.

The following describes transmission and reception process states of the transceiver according to the above-mentioned configuration. FIG. 6 shows baseband waveforms generated during a transmission process. As mentioned above, the baseband unit 300 outputs 2-channel transmission data, i.e., the I-channel transmission data TxI and the Q-channel transmission data TxQ. The delay circuit 131 provides delay amount $\Delta_2$ for the 2-channel transmission data TxI and TxQ to cause different timings between them. There is provided a phase difference of approximately 180 degrees between transmission data TxI of FIG. 6(a) and transmission data TxQ of FIG. 6(j).

The clock CLK I of FIG. 6(b) as the carrier and the CLK Q of FIG. 6(k) are configured to the frequency of cycles T0 through T7, i.e., eight times as fast as one chip of transmission data. The clock CLK Q has a period of cycles equivalent to an integral multiple (4 times in this example) of the clock CLK I and is configured to the timing that is later than the clock (carrier) by a 90-degree phase. The delay of the clock CLK Q from the clock CLK I is equivalent to the delay amount $\Delta_2$ provided by the above-mentioned delay circuits 125 and 131.

Based on the clock CLK I of FIG. 6(b), the baseband waveform generation circuit 132I generates the baseband waveform ShapeI of FIG. 6(h). That is to say, when the clock CLK I is supplied to the baseband waveform generation circuit 132I, the D flip-flops 141, 142, 143, and 144 output pulse waveforms Q1, Q2, Q3, and Q4 of FIG. 6(c), 6(d), 6(e), and 6(f), respectively, which are shifted one clock cycle from each other. These pulse waveforms are added to be output as the baseband waveform ShapeI of FIG. 6(h). The baseband waveform ShapeI is a cyclic waveform and repeatedly increases and decreases parabolically in units of eight cycles of the clock CLK I.

The multiplier 133I multiplies the baseband waveform ShapeI of FIG. 6(h) by the clock CLK I to generate the signal LOI of FIG. 6(i). In the signal LOI, the wave height of the clock CLK I corresponds to the level of the baseband waveform ShapeI. The multiplier 136I multiplies the signal LOI by the transmission data T×I of FIG. 6(a) to pulse-modulate the transmission data T×I.

Based on the clock CLK Q of FIG. 6(j), the baseband waveform generation circuit 132Q generates the baseband waveform ShapeQ of FIG. 6(o). That is to say, the D flip-flops 141, 142, and 143 supply the baseband waveform generation circuit 132Q with inverted outputs Q1, Q2, and Q3 of FIG. 6(l), 6(m), and 6(n), respectively, which are pulse waveforms shifted one clock cycle from each other. These pulse waveforms are added to be output as the baseband waveform ShapeQ of FIG. 6(o). The baseband waveform ShapeQ is a cyclic waveform and repeatedly increases and decreases parabolically in units of eight cycles of the clock CLK I. The baseband waveform ShapeQ is phase-shifted from the baseband waveform ShapeI (FIG. 6(h)) by 180 degrees. The 180-degree phase shift is equivalent to a half-chip shift from the viewpoint of the chip cycle for the I-channel and Q-channel transmission data. The phase here assumes that one cycle of the baseband waveform corresponds to 360 degrees.

The multiplier 133Q multiplies the baseband waveform ShapeQ of FIG. 6(o) by the clock CLK Q to generate the signal LOQ of FIG. 6(p). In the signal LOQ, the wave height of the clock CLK Q corresponds to the level of the baseband waveform ShapeQ. The multiplier 136Q multiplies the signal LOQ by the transmission data T×Q of FIG. 6(j) to pulse-modulate the transmission data T×Q.

The adder 134 in FIG. 3 adds a multiplied output from the multiplier 136I and a multiplied output from the multiplier 136Q to mix pulse-modulated signals from the transmission data T×I and T×Q. As a result, a transmission signal is generated by mixing the I-channel and Q-channel signals and maintaining the orthogonal relationship. The transmission signal is amplified and processed otherwise and is transmitted wirelessly.

Figure 7:
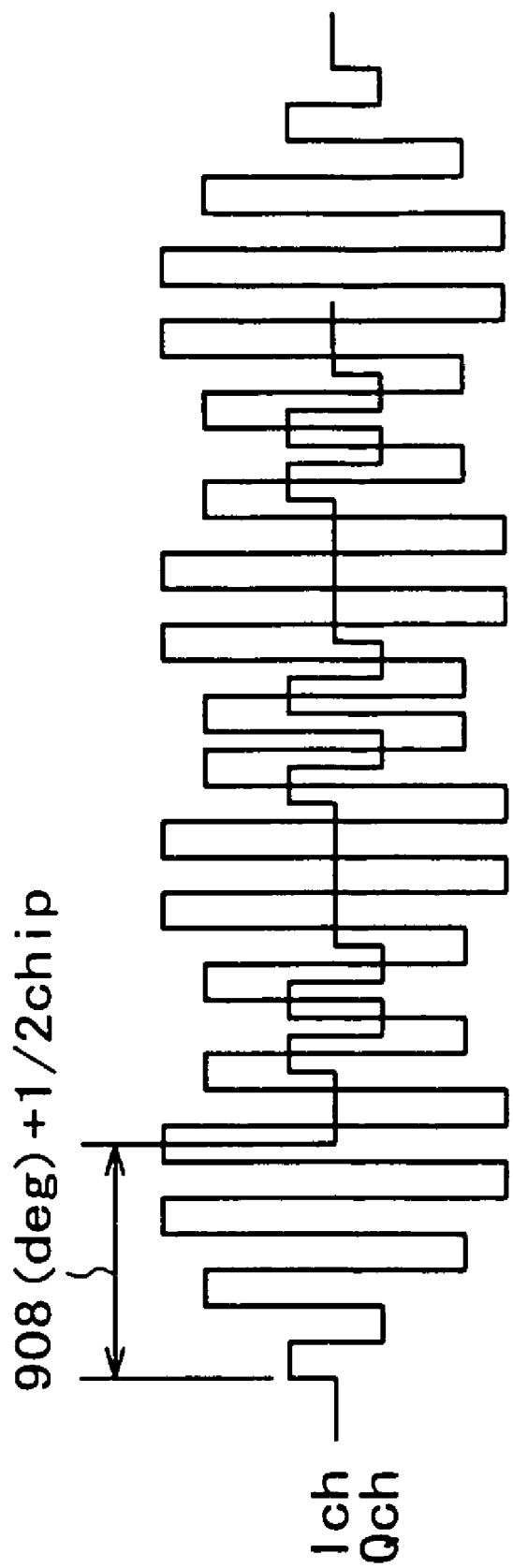
FIG. 7 exemplifies a time waveform of a π/2 shift BPSK signal according to the embodiment of the present invention.

FIG. 7 exemplifies a time waveform of the transmission signal generated by mixing the I-channel and Q-channel signals in the adder 134. In FIG. 7, the Q-channel signal is shown in a thick line. The I-channel signal is shown in a thin line. The Q-channel signal is delayed from the I-channel signal by an amount resulting from adding a half chip of the transmission data and a 90-degree shift of the clock (carrier) together. When the I-channel and Q-channel transmission data are modulated, their pulse amplitudes vary almost reversely to each other. Since the I-channel and Q-channel signals are shifted by the amount equivalent to 90 degrees of the carrier, both signals are phase-shifted by 90 degrees. The modulation of transmission signals generated in this manner is referred to as π/2 shift BPSK (Binary Phase Shift Keying).

Figure 8:
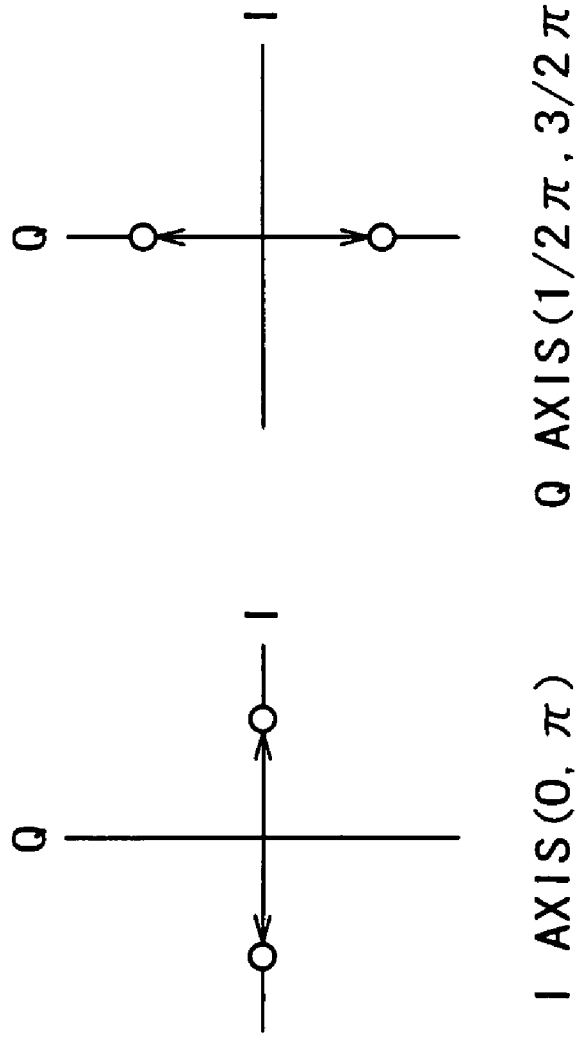
FIG. 8 shows the constellation of the π/2 shift BPSK.

FIG. 8 shows the constellation of π/2 shift BPSK signals generated in this manner. When a space is assumed to be formed by crossing the I axis and the Q axis orthogonally to each other, the I-channel signal is positioned to either of two points (0 and π) on the I axis as shown in FIG. 8(a). The Q-channel signal is positioned to either of two points (1/2π and 3/2π) on the Q axis as shown in FIG. 8(b).

FIG. 8(c) shows the constellation of mixing the I-channel and Q-channel signals that alternately shift to each other by approximately a half chip. This makes it possible to alternately activate either of two points on the I axis and either of two points on the Q axis. Consequently, with respect to a signal change, the signal appears at every sampling position approximately 90 degrees earlier or later than the most recent signal. This means a π/2 shift at every sampling position.

When receiving the signal that is transmitted in this manner, the RF unit performs the I-channel reception process and the Q-channel reception process independently of each other as shown in FIG. 2 to acquire the respective channel signals. The swap circuit 302 in FIG. 5 is provided to swap an I-channel signal and a Q-channel signal for every sample to generate single-channel received data. The baseband section just needs to realize a conventional process for single-channel received data. If the baseband section is configured to independently process the I-channel and Q-channel received data, however, the swap circuit 302 is unnecessary.

In this example, the selection switch 314 selects a signal at the reverse side of the signal selected by the selection switch 313 in the swap circuit 302 during reception. The signal selected by the selection switch 314 is supplied to the loop filter 306 and is used as a phase error signal for phase adjustment of the carrier. This makes it possible to adjust the carrier phase to the received signal and provide excellent transmission by synchronizing the transmitting side with the receiving side. In this case, the sign inverter 315 reverses the sign to solve the difference between a delay (negative value) of the I channel against the Q channel and a delay (positive value) of the Q channel against the I channel. The provision of the sign inverter 315 can always ensure the same sign for the error signal appearing in a signal supplied to the loop filter and prevent the loop filter from canceling values.

Since the π/2 shift BPSK modulation is used to pulse-modulate signals to be transmitted as UWB signals, the clock frequency determines the center frequency of the transmission band for a signal to be transmitted. Further, the clock frequency and the baseband waveform determine the bandwidth. For example, the transmission signal can comply with the UWB signal specifications. Unlike the conventional transmission processing of UWB signals, the transmission circuit need not use the band-pass filter to limit transmission signal bands. There is provided an effect of avoiding characteristics deterioration due to the use of the band-pass filter for band limitation.

According to the example, the I-channel and Q-channel signal components can be orthogonally crossed to each other and can be transmitted as a UWB signal. When the chip rate is constant, the chip length can be doubled in comparison with the conventional case of transmitting a BPSK-modulated UWB signal, making it possible to decrease the interference between chips. When the same chip length is used, signals can be transmitted at double the rate compared to the prior art.

Figure 9:
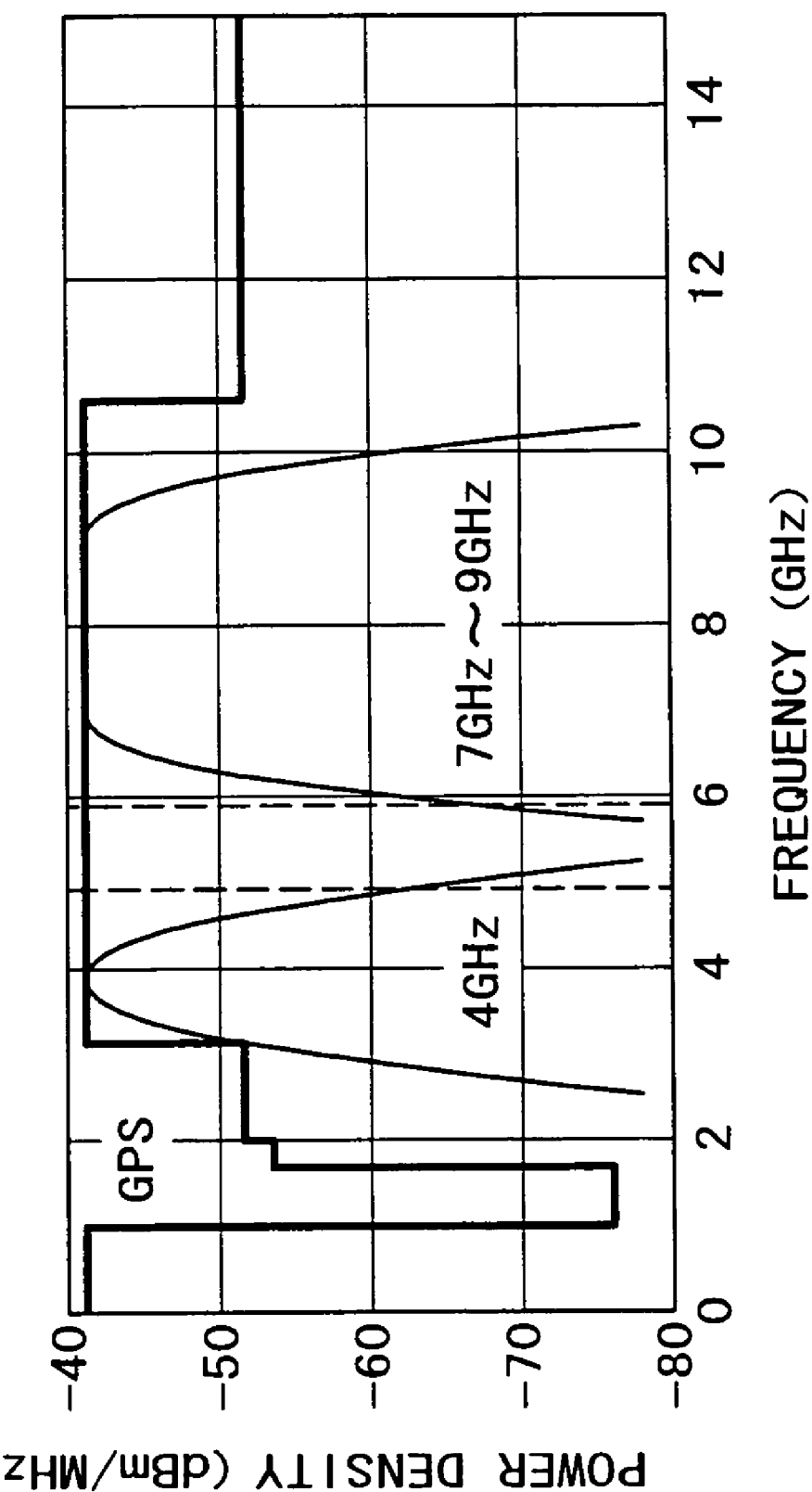
FIG. 9 is a characteristic diagram showing a 2-band frequency spectrum according to the embodiment of the present invention.

Since selecting a carrier frequency or the like easily sets transmission bands, an intended transmission band can be easily determined for the transmission signal. As shown in FIG. 1, for example, there are provided two RF units, i.e., the first RF unit 100 for lower band communication and the second RF unit 200 for upper band communication. In this case, as shown in FIG. 9, the first RF unit 100 can easily generate and transmit UWB signals for communication in the 4 GHz band. The second RF unit 200 can easily generate and transmit UWB signals for communication in the 7 to 9 GHz band. A thick line in FIG. 9 indicates the FCC compliant level for each frequency. A low power density is assigned to bands used for the GPS (Global Positioning System). Within this specification range, however, the approximately 5 GHz band is often used for the wireless LAN (Local Area Network). As shown in FIG. 9, the lower band is defined above the 5 GHz band. The upper band is defined below the 5 GHz band. This can provide an effective transmission system for UWB signals by avoiding the interference with the existing wireless LAN (WLAN).

Figure 10:
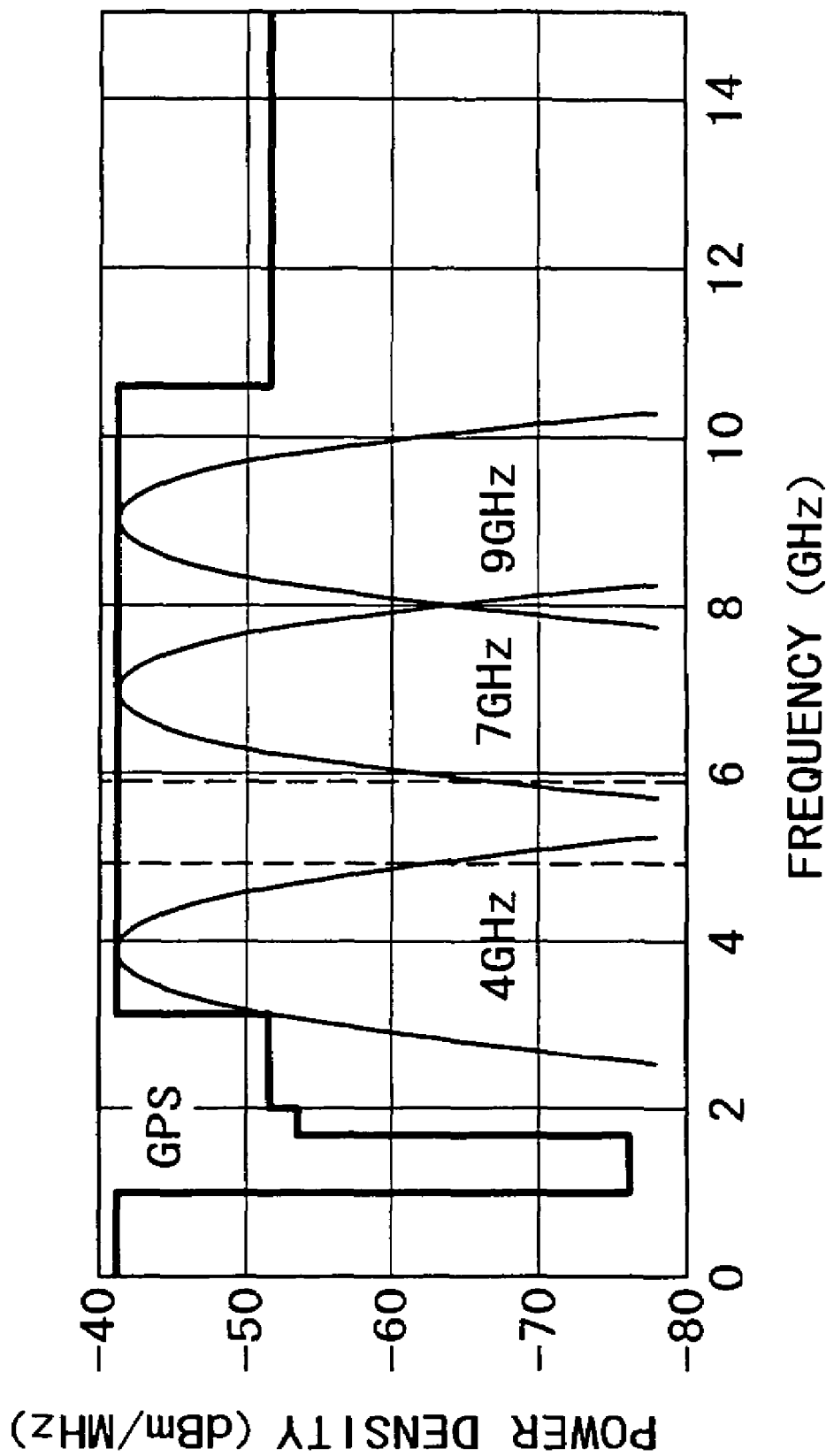
FIG. 10 is a characteristic diagram showing a 3-band frequency spectrum according to the embodiment of the present invention.

The upper band above the 5 GHz may be further divided into sub-bands. As shown in FIG. 10, a total of three transmission bands may be provided. The lower band comprises a 4 GHz band. The upper band comprises two bands, i.e., a 7 GHz band and a 9 GHz band. In this case, a special RF unit may be provided for each of three transmission bands. Alternatively, one RF unit may be used to choose from two or three transmission bands for transmission or reception. The lower band or the upper band may be further divided into more sub-bands than those mentioned above.

Figure 11:
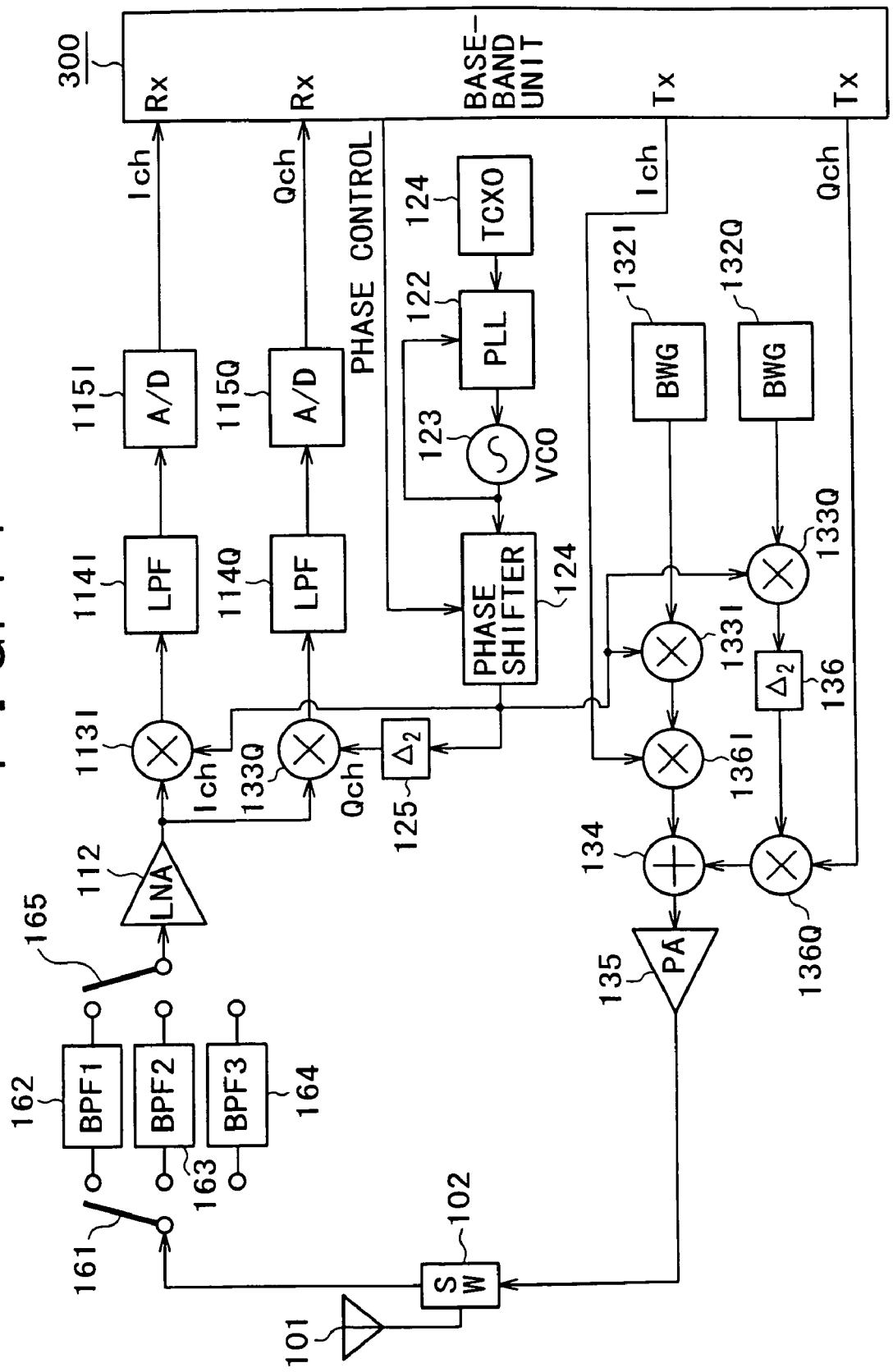
FIG. 11 is a block diagram showing another configuration example (providing a plurality of band-pass filters) of the RF unit according to the embodiment of the present invention.
Figure 12:
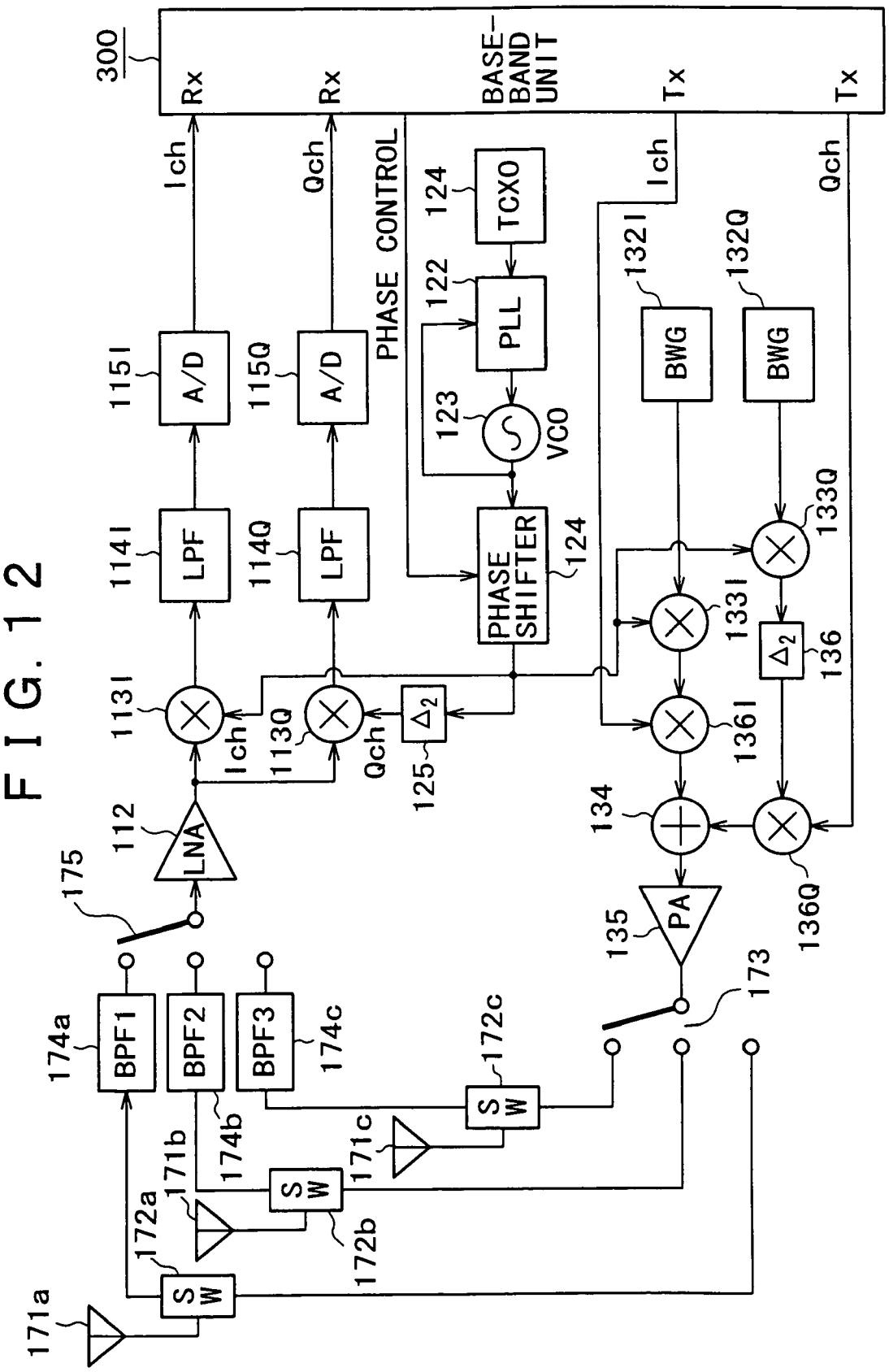
FIG. 12 is a block diagram showing yet another configuration example (providing a plurality of antennas and band-pass filters) of the RF unit according to the embodiment of the present invention.
Figure 13:
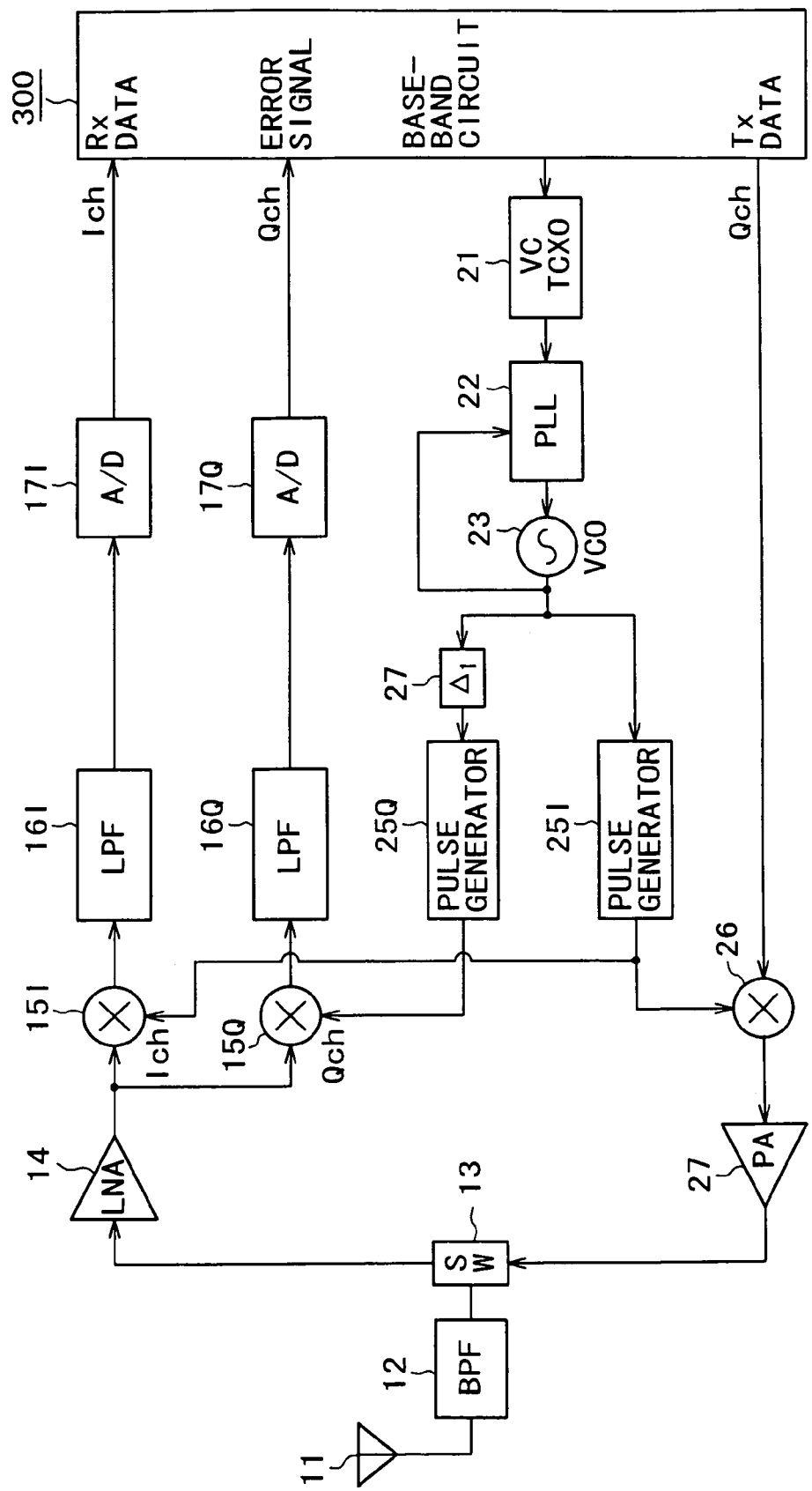
FIG. 13 is a block diagram showing a configuration example of a transceiver according to the conventional UWB system.
Figure 14:
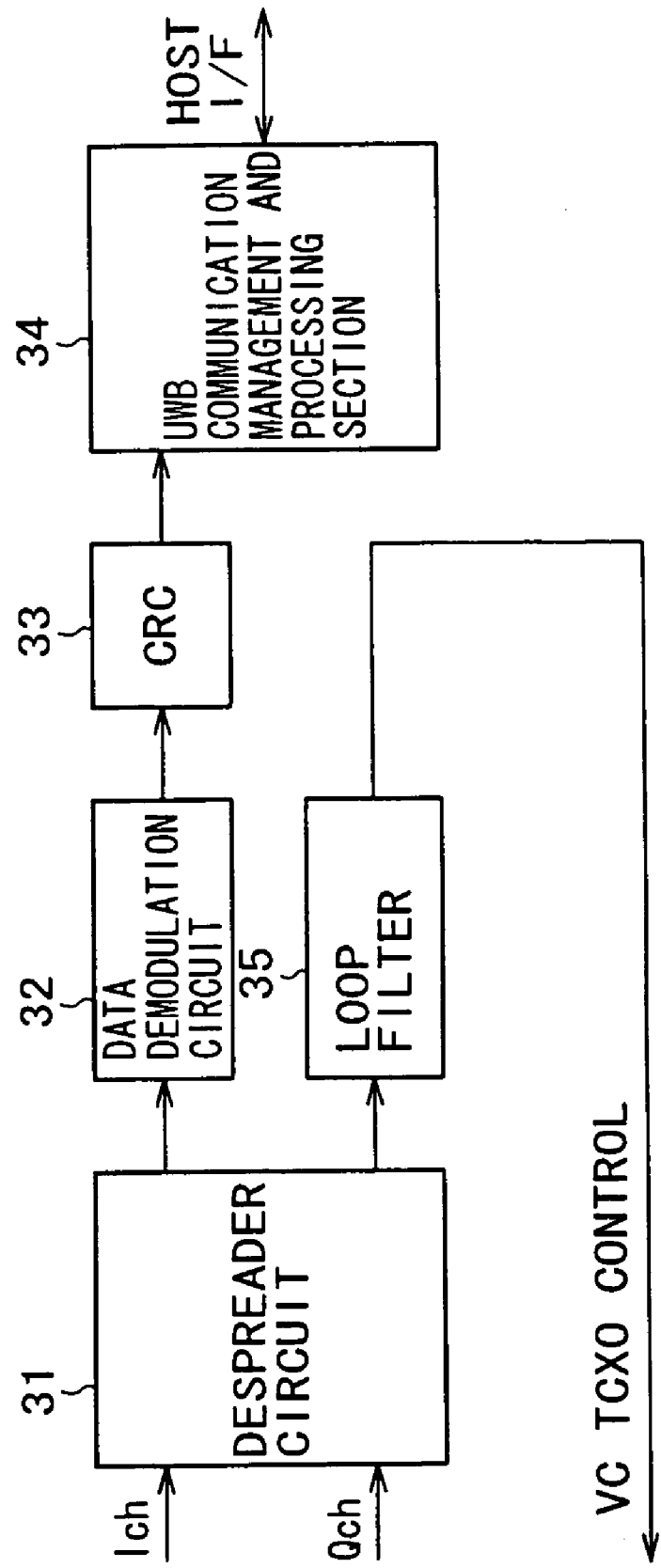
FIG. 14 is a block diagram showing a configuration example of a baseband circuit in the transceiver according to the conventional UWB system.
Figure 15:
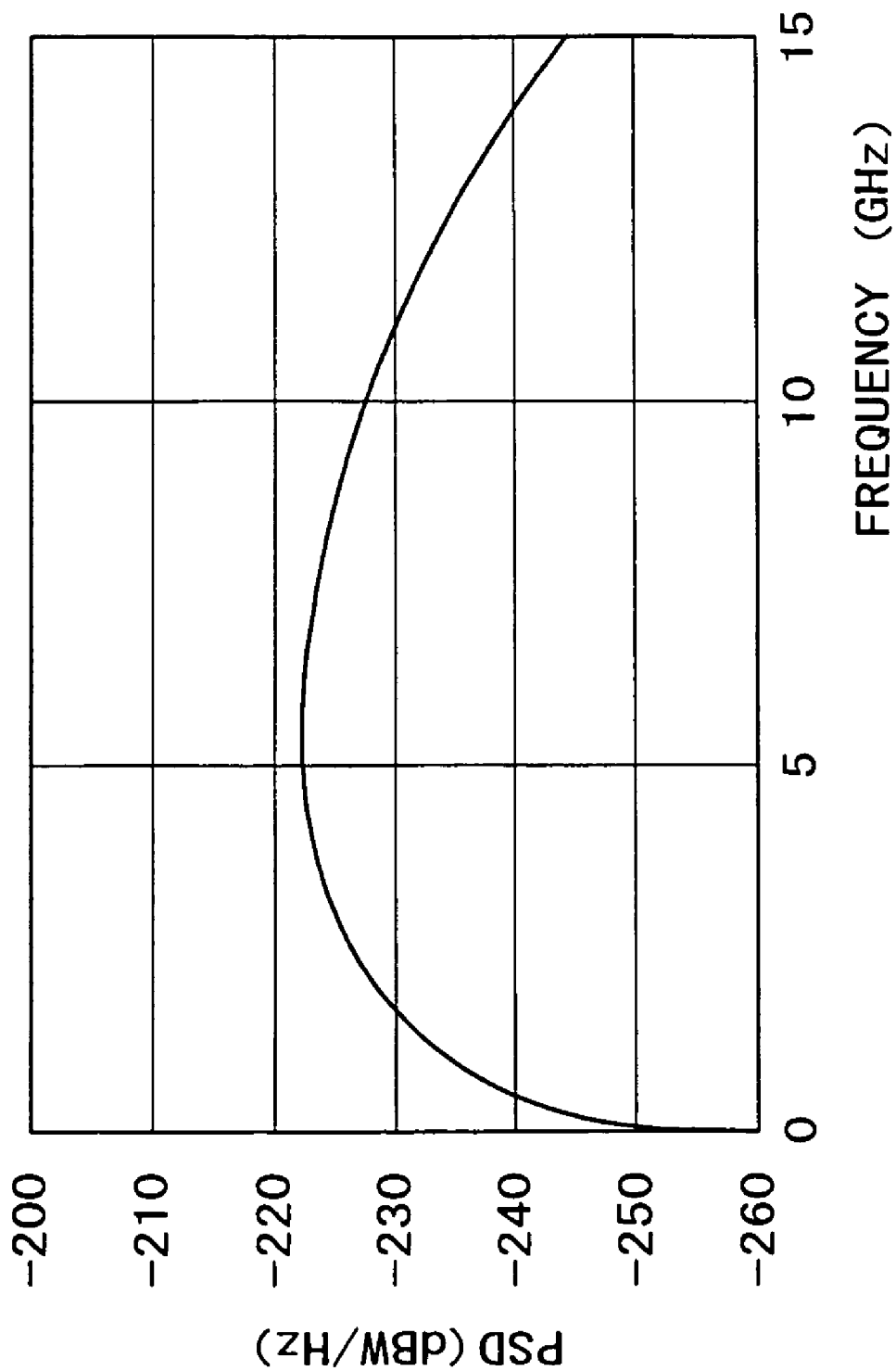
FIG. 15 is a characteristic diagram exemplifying a pulse frequency spectrum according to the conventional UWB system.
Figure 16:
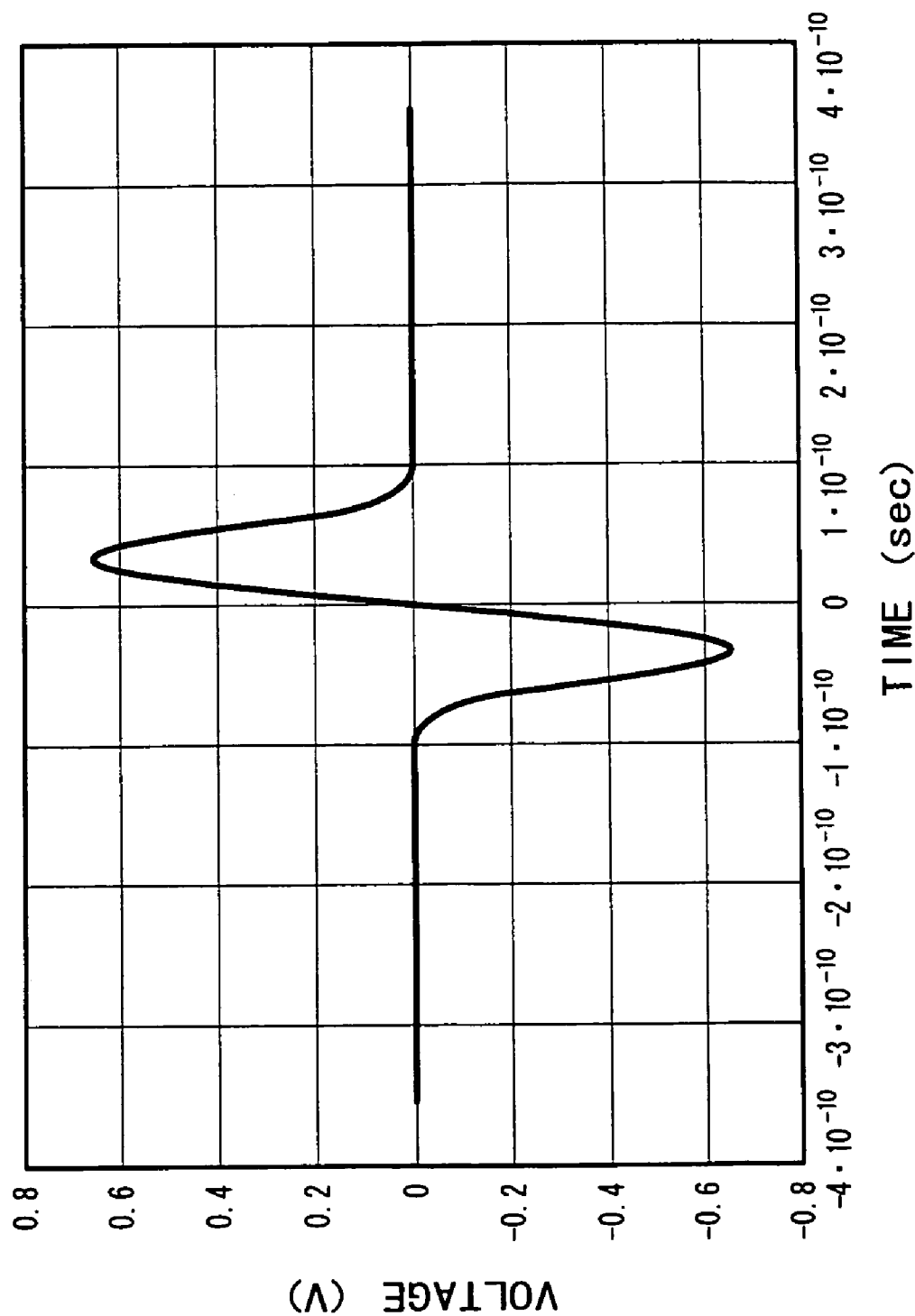
FIG. 16 is a characteristic diagram exemplifying the time waveform of a pulse according to the conventional UWB system.
Figure 17:
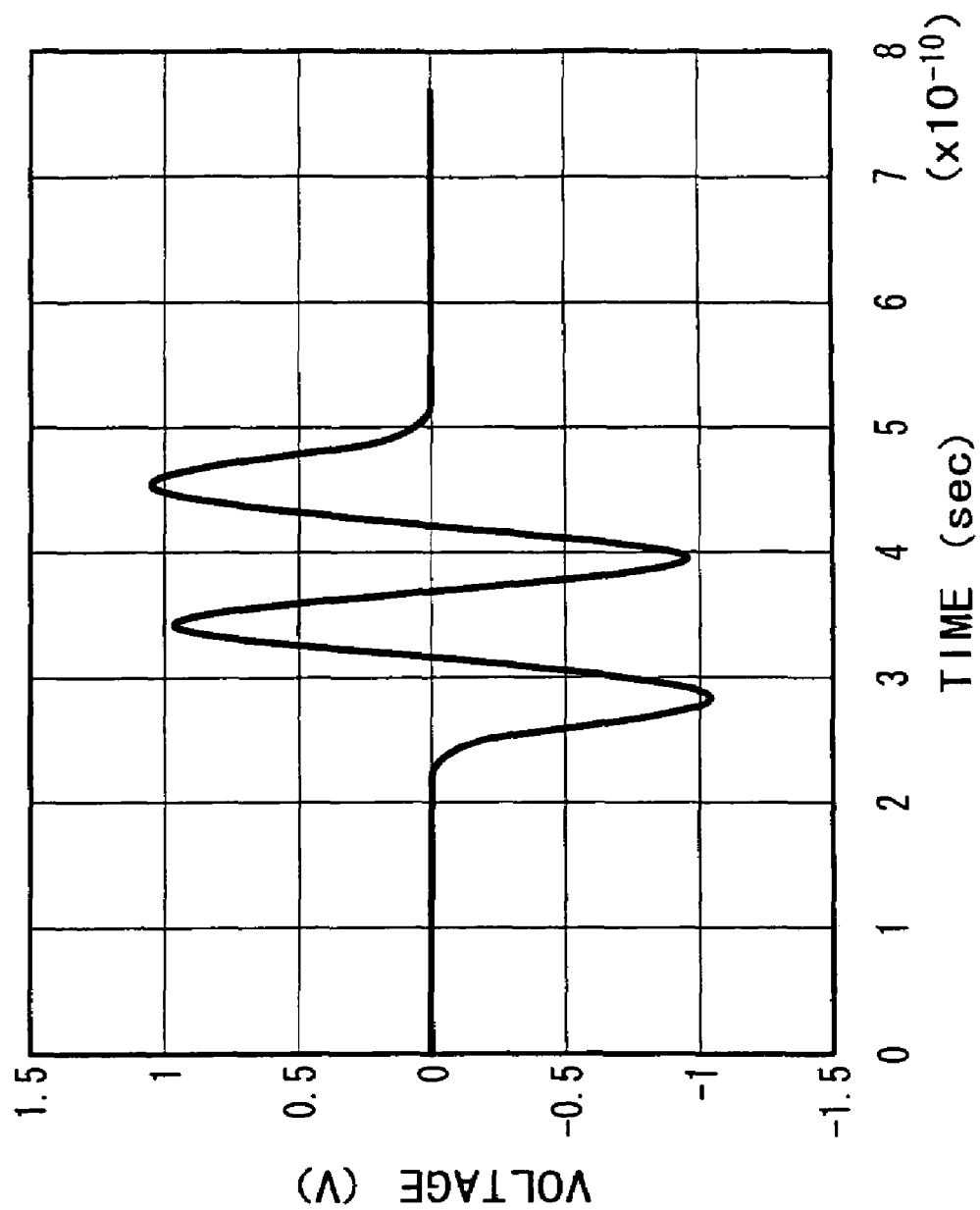
FIG. 17 is a characteristic diagram exemplifying the frequency spectrum of a 2-cycle pulse.
Figure 18:
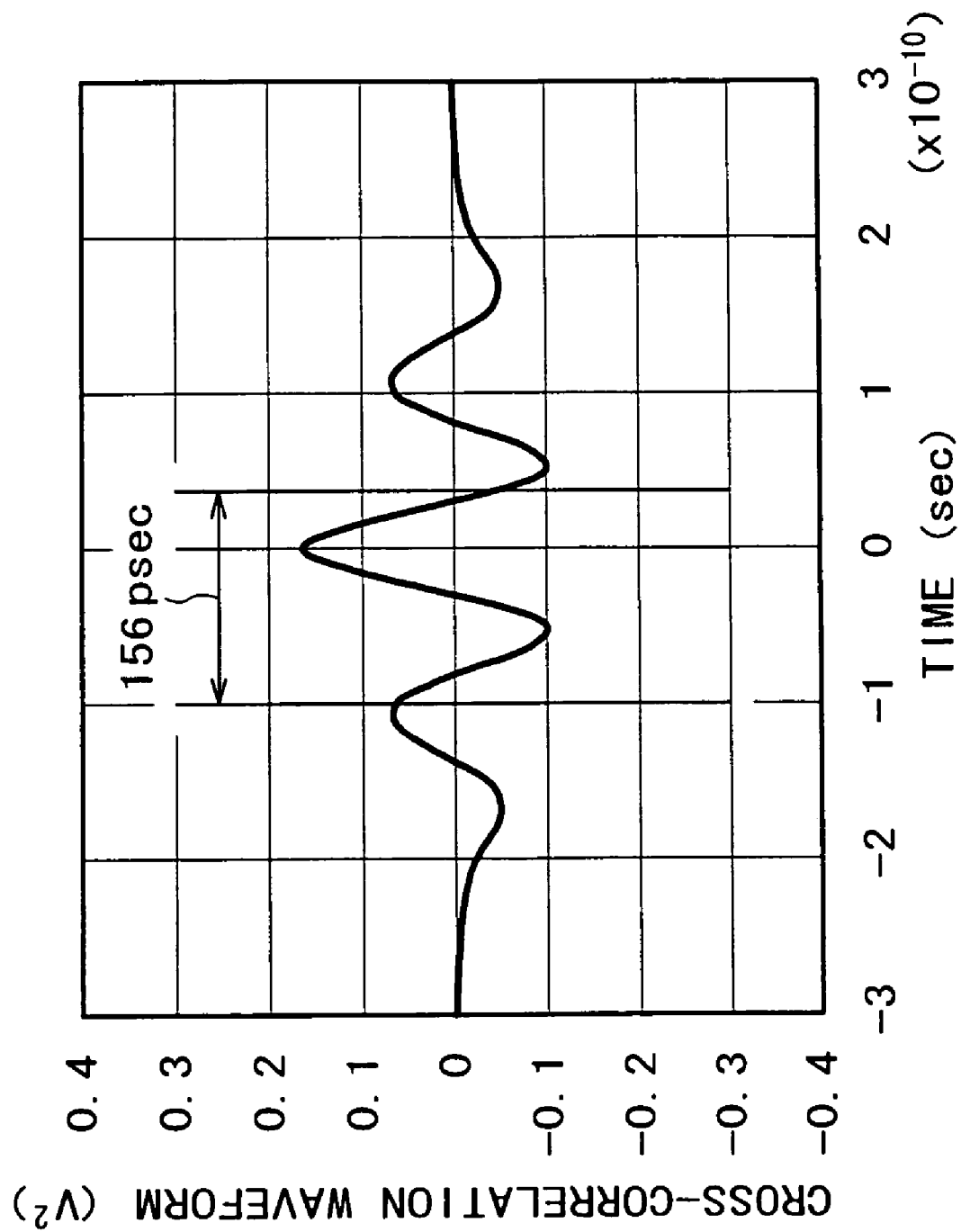
FIG. 18 is a characteristic diagram exemplifying the cross-correlation waveform of a 2-cycle pulse.

With reference to FIGS. 11 and 12, the following describes configuration examples of providing three transmission bands as shown in FIG. 10 and using one RF unit to process transmission and reception of the three transmission bands. The mutually corresponding parts of the RF unit in FIGS. 11, 12, and 2 are designated by the same reference numerals.

The RF unit in FIG. 11 differs from FIG. 2 in the connection configuration of the band-pass filter between the antenna changer 102 and the low noise amplifier 112 as a reception amplifier. According to the configuration in FIG. 11, the antenna changer 102 outputs a received signal that is then supplied to the selection switch 161. A selection switch 161 functions to choose from three band-pass filters 162, 163, and 164 having pass band characteristics corresponding to the reception band at that time. A selection switch 165 functions in interlock with the selection switch 161 and selects one of outputs from the band-pass filters 162, 163, and 164. The selected output is supplied to the low noise amplifier 112. When three bands are configured as shown in FIG. 10, three band-pass filters 162, 163, and 164 correspond to specific pass bands. That is to say, the band-pass filter 162 passes the 4 GHz band. The band-pass filter 163 passes the 7 GHz band. The band-pass filter 164 passes the 9 GHz band. A PLL circuit 122 is configured to be able to selectively generate carriers $f_1$, $f_2$, and $f_3$ correspondingly to the respective bands.

This configuration can use one RF unit to easily switch between the transmission bands. According to this configuration, only the reception system requires the band-pass filters. One band-pass filter needed for the reception system passes the bandwidth of a sub-band. Accordingly, the band-pass filter just needs to pass a relatively narrow band. It is possible to use band-pass filters having relatively excellent characteristics. The other parts of the RF unit in FIG. 11 may be configured similarly to those of the RF unit in FIG. 2.

FIG. 12 shows another example of the RF unit. The RF unit in FIG. 12 independently provides not only the band-pass filters, but also antennas and antenna changers correspondingly to the transmission bands. The output from the power amplifier 135 for transmission supplies an output to a selection switch 173. The selection switch 173 can selectively supply the transmission signal to three antenna changers 172a through 172c. The antenna changer 172a, 172b, and 172c are connected to antennas 171a, 171b, and 171c. The antennas 171a, 171b, and 171c are provided with appropriate transmission and reception bands. For example, the antenna 171a is appropriate for transmission and reception of 4 GHz band signals. The antenna 171b is appropriate for transmission and reception of 7 GHz band signals. The antenna 171c is appropriate for transmission and reception of 9 GHz band signals.

Output sides of the antenna changer 172a, 172b, and 172c for the received signal connect with band-pass filters 174a, 174b, and 174c having different pass band characteristics. A selection switch 175 selects one of outputs from the band-pass filters 174a, 174b, and 174c and supplies the selected output to the low noise amplifier 112. The selection switch 173 and the selection switch 175 operate in interlock with band settings for transmission and reception. The three band-pass filters 174a, 174b, and 174c correspond to specific bands. For example, the band-pass filter 174a passes 4 GHz band signals. The band-pass filter 174b passes 7 GHz band signals. The band-pass filter 174c passes 9 GHz band signals. The PLL circuit 122 is configured to be able to selectively generate carriers $f_1$, $f_2$, and $f_3$ correspondingly to the respective bands. The other parts of the RF unit in FIG. 12 may be configured similarly to those of the RF unit in FIG. 2.

The above-mentioned configuration makes it possible to select not only the band-pass filter for reception, but also the antenna for transmission and reception so that the transmission band can be optimized. It is possible to further improve the transmission and reception characteristics.

The above-mentioned embodiment has shown examples of the frequency bands used as the transmission bands and the number of divisions. It is to be distinctly understood that the other frequencies and values may be selected within the spirit and scope of the invention.

The above-mentioned embodiment has described the example of the communication apparatus dedicated to transmission and reception. Further, for example, a personal computer for various data processing may be mounted with a board or a card designed for the communication processing equivalent to the RF unit according to the embodiment. The computer may be provided with the software to perform the processing in the baseband section.

The transmission method and the transmitter according to the present invention quadrature-modulate the first and second transmission data sequences to transmit a so-called $\pi/2$ shift BPSK modulated wave. Accordingly, the efficient transmission becomes available compared to the case of transmitting a BPSK-modulated UWB signal, for example. When the chip rate is assumed to be constant, for example, the chip length can be doubled compared to a conventional BPSK modulation wave.

Selecting the baseband waveform and the carrier frequency makes it possible to properly select the transmission frequency and the bandwidth for a transmission signal. This enables the UWB transmission in compliance with frequency division multiplexing, for example. In this case, it is unnecessary to use the band-pass filter that controls transmission signal bands to limit transmission bandwidths. It becomes possible to solve the problem of interfering with transmission waveforms due to the use of the band-pass filter and improve the transmission characteristics.

Since the frequency division multiplexing uses the independent transmission antenna for each sub-band, it is possible to use the transmission antenna appropriate for each divided frequency band and further improve the transmission characteristics.

The reception method and the receiver according to the present invention can extract the first and second received data quadrature-modulated onto the received signal in synchronization with the received carrier. It becomes possible to receive and demodulate a signal that is transmitted as the so-called $\pi/2$ shift BPSK modulation wave. Therefore, it is also possible to receive efficiently transmitted signals.

In this case, the first and second received data are alternately selected at a specified sampling cycle to generate a unified received data sequence. It becomes possible to extract two pieces of quadrature-modulated received data. During the alternate selection, components extracted from the unselected data are used for phase adjustment of the received carrier. This can easily provide efficient phase adjustment of the received carrier and improve the reception characteristics.

The independent reception antennas are used for corresponding sub-bands when receiving signals that are transmitted in accordance with the frequency division multiplexing. It is possible to use the reception antennas appropriate for the respective divided frequency bands, making it possible to further improve the reception characteristics. Moreover, it is possible to use filters appropriate the reception bands by selecting the filters for the corresponding reception bands. Also from this point of view, the reception characteristics can be improved.

What is claimed is:

1. A reception method of a communication receiving device, comprising:
    acquiring a received carrier of a specified frequency at the communication receiving device;
    extracting a received signal for a transmission band at the communication receiving device, multiplying the extracted received signal by the received carrier, and sampling the multiplied signal at a specified cycle equivalent to an integral multiple of the received carrier to acquire first received data; and
    multiplying, at the communication receiving device, the received signal by a phase-shifted received carrier resulting from phase-shifting the received carrier and sampling the multiplied signal at a specified cycle equivalent to an integral multiple of the received carrier to acquire second received data.

2. The reception method according to claim 1,
    wherein the first and second received data are alternately selected at a specified sampling cycle to generate a unified received data sequence.

3. The reception method according to claim 2,
    wherein the received carrier is phase-adjusted by components extracted from data not selected in the selection process.

4. The reception method according to claim 1,
    wherein at least first and second sub-bands are provided by dividing a transmission band for received signals; and
    wherein a frequency of the received carrier is selected to transmit a received signal using the first or second sub-band.

5. The reception method according to claim 4, further comprising:
    receiving a signal using a different antenna for each of the sub-bands and extracting the received signal using a filter provided for each of the sub-bands.

6. A receiver comprising:
    a carrier generation means for generating a received carrier of a specified frequency;
    a filter to pass a received signal for a transmission band;
    a first reception means for multiplying an output from the filter by the received carrier, and sampling the multiplied signal at a specified cycle equivalent to an integral multiple of the received carrier to acquire first received data; and
    a second reception means for multiplying an output from the filter by a phase-shifted received carrier resulting from phase-shifting the received carrier and sampling the multiplied signal at a specified cycle equivalent to an integral multiple of the received carrier to acquire second received data.

7. The receiver according to claim 6, further comprising:
    a selection means for alternately selecting the first and second received data at a specified sampling cycle to generate a unified received data sequence.

8. The receiver according to claim 7,
    wherein the received carrier generated from the carrier generation means is phase-adjusted by components extracted from data not selected in the selection process.

9. The receiver according to claim 6,
    wherein at least first and second sub-bands are provided by dividing a transmission band for received signals; and
    wherein a frequency of the received carrier is selected to transmit a received signal using the first or second sub-band.

10. The receiver according to claim 9,
    wherein the sub-bands are provided with a plurality of antennas for acquiring a received signal; and
    wherein the filter is provided for each of the sub-bands.

* * * * *